Jan. 4, 1938.   C. S. FRANKLIN   2,104,075
RADIO DIRECTION FINDER
Filed Jan. 16, 1935   2 Sheets-Sheet 2

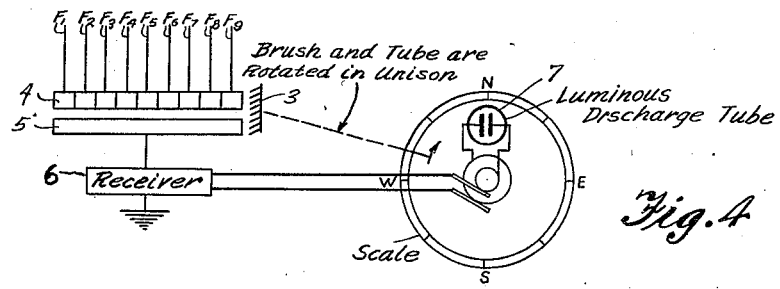
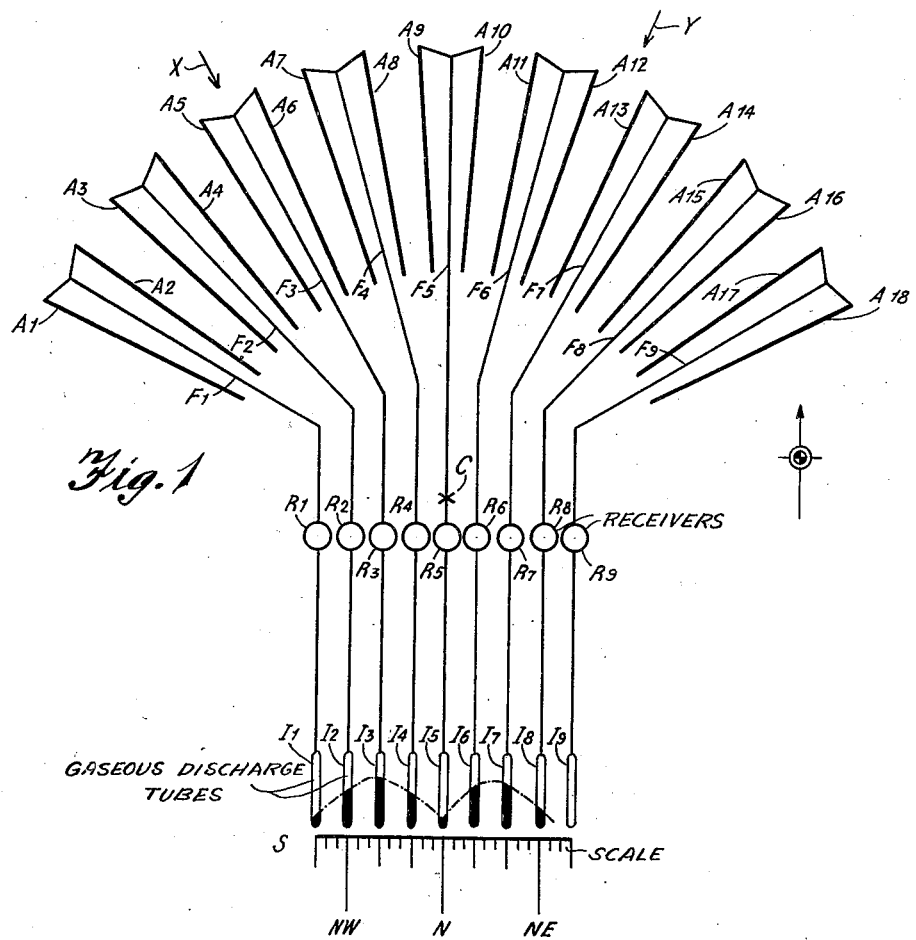

INVENTOR.
CHARLES S. FRANKLIN
BY
*H. S. Snover*
ATTORNEY.

Patented Jan. 4, 1938

2,104,075

UNITED STATES PATENT OFFICE 2,104,075

RADIO DIRECTION FINDER

Charles Samuel Franklin, Poldhu, near Mullion, England, assignor to Radio Corporation of America, a corporation of Delaware Application January 16, 1935, Serial No. 2,044
In Great Britain January 27, 1934

7 Claims. (Cl. 250—11)

This invention relates to directional radio receiving installations suitable for use for position finding and navigation purposes generally.

The object of the invention is to provide a relatively simple and satisfactory receiving installation which can receive signals from almost any number of differently positioned transmitters simultaneously and indicate the directions of these transmitters with respect to the receiving installation.

According to this invention a wireless receiving installation comprises a plurality of directional receiving aerials or aerial systems having maximum directivity in different directions with respect to a central point, means for translating signals received upon said aerials or systems into visible indications, and means for arranging said visible indications in such manner that each indication corresponds in position to the direction of directivity of the receiving aerial or system from which that indication is derived. In this way the result achieved is that each indication produces, as it were, a point upon an imaginary curve connecting the indications so that the direction of the transmitters which has given rise to the received signals, will be indicated by the shape of said imaginary curve.

In carrying out this invention, it is preferable to employ a directional aerial such as shown and described in my U. S. Patent 2,053,658, issued September 6, 1936. In carrying out the present invention, however, the use of such serials is not absolutely essential.

Where a receiving installation according to this invention is employed for direction indicating and position finding for land and sea work, the directional receiving aerials or systems will generally be arranged in a circle about a central point. Where, however, aerial navigation is in question, i. e., where directional indication in three dimensions is required, the aerials or systems would ordinarily be placed on the surface of an imaginary sphere.

The invention is illustrated in and further explained in connection with the accompanying schematic and diagrammatic drawings, in which Fig. 1 shows diagrammatically a system of aerials each connected with a receiving system;

Figure 2:
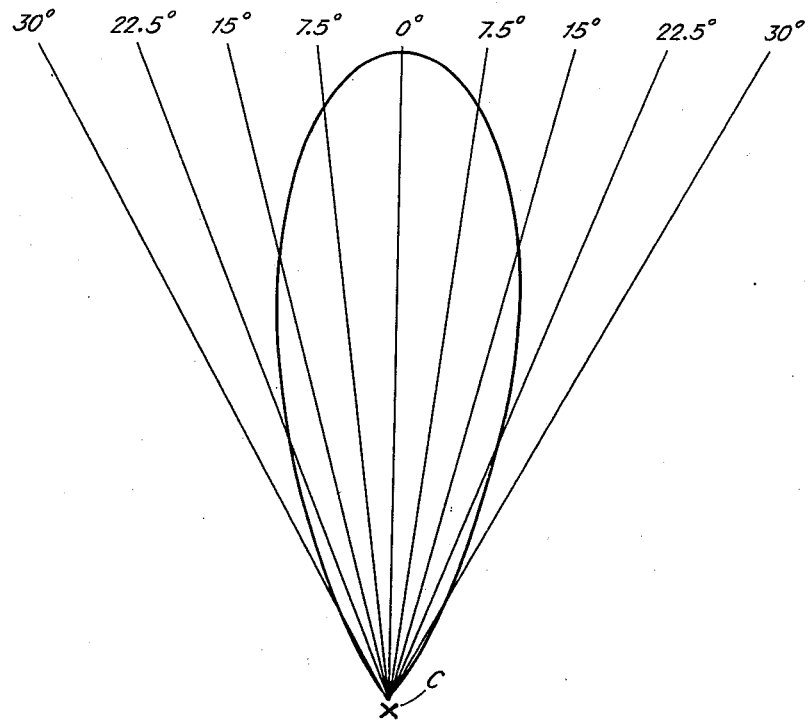
Fig. 2 shows diagrammatically a curve of field strength values for a directional beam.

Referring to Figure 1, which shows one way of carrying out this invention, a plurality of aerial systems in accordance with the aforementioned U. S. Patent 2,053,658, are arranged each to "point" in a different direction. In the example illustrated, there are 18 aerials indicated by heavy lines labeled $A_1$ to $A_{18}$, arranged in a segment of a circle (whose centre is indicated by the reference C) each "pointing" in a different radial direction. Each aerial is about four times the working wave length long and the said aerials are spaced apart by approximately 0.8 of the working wave length. The angle between successive aerials is 7.5° and that between successive pairs of aerials is 15°. The polar curve of a pair of the aerials (the aerials $A_9$ and $A_{10}$ are taken for purposes of exemplification) is shown in conventional form in Figure 2, the curve being a curve of field strength values. Each pair of aerials is connected through a feeder $F_1$–$F_9$ common to that pair. In contrast with the heavy lines which represent the aerials these feeders are represented by light lines and they are each connected to a separate receiver $R_1$–$R_9$ actuating some form of visual indicator $I_1$–$I_9$, e. g., a meter indicating the strength of the received signals. The indicators are mounted side by side with their indicating members so positioned as to move at right angles to a horizontal scale S which is marked out in directions corresponding to the directions in which the various aerials "point". Suppose with such an installation that incoming signals arrive from the two directions X and Y, then the indications of the indicators will be more or less as shown in Figure 1 by the filled in portions of the vertically disposed tubular elements $I_1$–$I_9$ which are preferably gaseous discharge tubes. Thus, when signals are received from two different stations in the directions X and Y, the imaginary curve (shown in fine lines in Figure 1) joining the indications given will have peaks corresponding to the directions of the two received stations. There are various forms of indicators which may be used in carrying out the invention; for example, the indicator energized in dependence upon the output from each aerial may be in the form of a vacuum tube fitted with electrodes and arranged to give a column of light of length substantially proportional to the energy output from the appropriate aerial. Such indicators are schematically represented in Figure 1.

With aerials as employed in Figure 1, the directions of incoming signals can generally be estimated to about 3 to 4 degrees, if necessary. Where the signals come from a plurality of transmitters sending continuous dashes, the registrations on the indicators tend to overlap unless the angle between adjacent directions is more than about 45 degrees. If, however, each transmitter is sending a distinctive call, so that reception from all is not always simultaneous, then the direction of each and the angle between them can be judged to about 3 to 4 degrees.

It will be observed that the discriminating power depends on the sharpness of the polar curves obtained with the elementary aerials or systems employed. It follows that the shorter the wave length, the smaller will be the space occupied by the aerials or systems or alternatively the greater will be the discriminating power obtained for equal space occupied. A discriminating power, as obtained with the arrangement of Figure 1, would be sufficient to allow a ship, for instance, to be guided between two beacons. The aerials or systems may be erected to cover any desired arc in the horizontal or vertical plane, and may be arranged to be rotatable as a whole so as to enable observations to be taken in any particular arc of a circle. A reduction in the number of aerials or systems and of the space occupied may thus be effected at the sacrifice of what may be called the field or arc of observation for any one position of the aerial installation as a whole.

Figure 3:
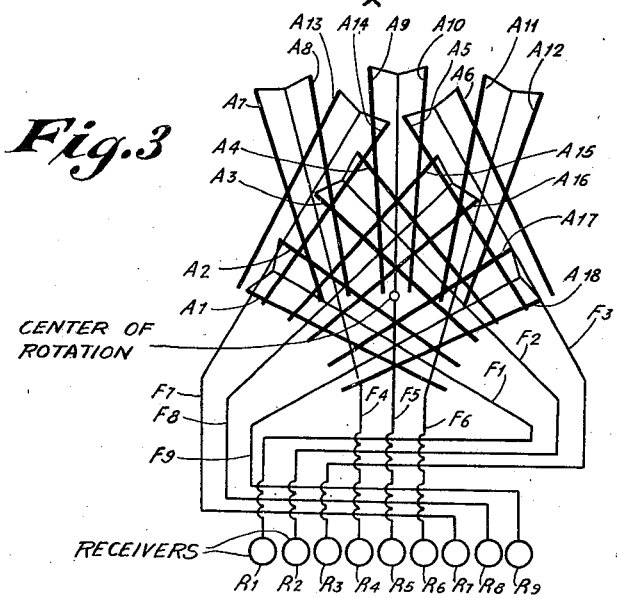
Fig. 3 shows a modified arrangement of aerials of the same type otherwise shown in Fig. 1, and, Fig. 4 shows a modification of the invention in which a commutator switch is employed.

In cases where direction in one plane only is required (say the horizontal plane) space can be saved by arranging the aerials singly or in groups above one another. For example, the eighteen aerials shown in Figure 1 may be rearranged as indicated in Figure 3. Here the aerials $A_1$ to $A_6$ are arranged under the aerials $A_7$ to $A_{12}$, while above these are arranged the aerials $A_{13}$ to $A_{18}$. The directions of "pointing" of the aerials in Figure 3 is the same as in Figure 1, but the area occupied by them is much reduced at the expense of greater height. In Figure 3 the indicators and scale are not shown.

Where directional indication in three dimensions is required, the indicator system is preferably such that indication is given by a spot of light whose character, e. g., color and/or intensity, is arranged to be changed in dependence upon the strength of the signal received upon the aerial or system actuating the indicator.

A convenient form of indicator which may be employed is a cathode ray tube of the kind in which the ray is projected upon a fluorescent screen to give a visible indication.

In another way of carrying out this invention, as shown in Fig. 4, a single receiver is employed and the aerials or aerial systems are arranged to be actuated successively thereby through a suitable form of continuously running commutator switch or coupling device. The commutator is shown having a brush 3 which sweeps over different segments 4 each segment being connected to one of the conductors $F_1$–$F_9$ respectively. The brush also sweeps over a collector ring 5 thereby to connect different ones of the segments 4 with the receiver 6. The brush 3 and the luminous discharge tube 7 are rotated in unison so that as the tube 7 is lighted up by signals different directional indications may be made depending upon the direction from which the signals are received on the different antennae feeding to the different conductors $F_1$–$F_9$. The output of the receiver is utilized to give indications at different parts of a directional scale, the arrangement being synchronous so that when the receiver is connected to an aerial or system "pointing" in any particular direction the indication appears opposite that part of the scale corresponding to the same direction. If the succession of aerial connections is sufficiently rapid the output curve of the system will appear continuously on the scale and will show directly the direction or directions of a station or stations being received.

It will be at once apparent that if two or more stations are being received simultaneously, the direction of both will be indicated simultaneously providing—as will normally be the case—the angles between them are sufficiently large.

The indicating mechanism employed may be of any suitable kind but should preferably be such as to enable the desired information as to direction to be immediately seen by direct inspection of the indicators, i. e., without having to record (graphically or otherwise) their indications.

The invention may be utilized for general nagivation purposes and one application which may be mentioned is to aircraft. For this application the invention may be utilized to provide direct indication on an aircraft of the relative angular positions of a number of transmitters near which the aircraft is passing. In such an application the aircraft would be fitted with indicating apparatus as above described and arranged to be energized by a plurality of directional aerials arranged over a portion of an imaginary spherical surface. For such application of the invention the wave lengths employed should be as small as practicable in order to reduce the sizes of the aerials to a minimum consistent with obtaining the required discrimination between transmitters.

For land and sea work—where it will generally be sufficient to arrange the aerials in a circle—longer wave lengths can be used.

Having now described and ascertained the nature of my invention and in what manner the same is to be performed, I claim:

1. A receiving system comprising a plurality of directional receiving aerials arranged in pairs, each pair having its axis of maximum directivity response oriented at an angle to such axes of the other pairs, means including luminous discharge tubes arranged in order for indicating different directions from which signals may be received on said aerials, said tubes having the characteristic that a column of light of variable length may be produced therein, operating circuits connecting each pair of said aerials with an appropriate one of said luminous discharge tubes, and a power supply connected to said operating circuits, said circuits being arranged to feed potentials to said discharge tubes proportionately to the amplitudes of the signaling energy collected by said aerials.

2. A system in accordance with claim 1 and having a graduated scale along which said luminous discharge tubes are positioned, whereby the indications made by said tubes may be translated into compass-chart directions.

3. In a device of the class described, a plurality of directional receiving aerials each differently oriented so as to collect a maximum of signalling energy from a direction along its own axis and having the respective axes thereof disposed at substantially equal angles, one to the next, about a common center, and a signal responsive device individually connected to each aerial, the plurality of said devices being arranged adjacent one another in the same order as their corresponding aerials, each responsive device comprising a luminous discharge tube having the characteristic that when suitably excited it produces a column of light of variable length, and means operating in dependence upon the amplitude of the energy collected by a given aerial for determining the length of said column of light which is caused to emanate from said discharge tube.

4. A device in accordance with claim 3 and embodying further means for receiving directional signals on a selected one of said responsive devices at a sufficiently high speed to maintain persistence of vision of the indication therein.

5. A device in accordance with claim 3 and further characterized in that the aerials are arranged in different groups each group being at a different level with respect to the aerials in other groups.

6. A device in accordance with claim 3 and further characterized in that said aerials are maintained at predetermined angles one to another and means are provided for orienting the entire system of aerials about a center of rotation.

7. A device in accordance with claim 3 and having means for maintaining said aerials in such positions as to be directionally oriented one with respect to another in three dimensions.

CHARLES SAMUEL FRANKLIN.